(12) United States Patent
Glaser

(10) Patent No.: US 10,332,022 B2
(45) Date of Patent: *Jun. 25, 2019

(54) SYSTEM FOR GENERATION OF GROUPS OF ENTANGLED PARTICLES FOR INTERACTION WITH COMMUNICATION POINT DEVICES

(71) Applicant: Lawrence F. Glaser, Needles, CA (US)

(72) Inventor: Lawrence F. Glaser, Needles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,142

(22) Filed: Sep. 1, 2017

(65) Prior Publication Data

US 2018/0075365 A1 Mar. 15, 2018

Related U.S. Application Data

(63) Continuation of application No. 14/752,758, filed on Jun. 26, 2015, now Pat. No. 9,754,214.

(60) Provisional application No. 62/018,509, filed on Jun. 27, 2014.

(51) Int. Cl.
*G21K 5/04* (2006.01)
*G06N 10/00* (2019.01)
*G06N 99/00* (2019.01)

(52) U.S. Cl.
CPC ........... *G06N 10/00* (2019.01); *G06N 99/002* (2013.01)

(58) Field of Classification Search
CPC .. H05H 3/00; H05H 3/02; H05H 3/04; H05H 3/06; G21K 1/14; G02B 21/32
USPC ........................................................ 250/251
See application file for complete search history.

(56) References Cited

U.S. PATENT DOCUMENTS

| | | | |
|---|---|---|---|
| 9,754,214 B1 * | 9/2017 | Glaser | G06N 99/002 |
| 2009/0268276 A1 | 10/2009 | Lee et al. | |
| 2013/0308956 A1 | 11/2013 | Meyers et al. | |
| 2015/0055961 A1 | 2/2015 | Meyers et al. | |
| 2015/0256270 A1 | 9/2015 | Paller | |
| 2016/0191173 A1 | 6/2016 | Malaney | |

* cited by examiner

*Primary Examiner* — Nicole M Ippolito
(74) *Attorney, Agent, or Firm* — Studebaker & Brackett PC

(57) ABSTRACT

Maximally entangled particle groups, organized into defined, shaped pulses, and patterns made up of these shaped pulses are described. Using the system and method of the present disclosure, a first group of maximally entangled particles is maximally entangled with another, second group of maximally entangled particles forming at least two groups of maximally entangled particles. These two groups are maximally entangled inter-group and maximally entangled intra-group. These groups can be manipulated in a quantum device to provide virtually error free logic in a quantum computing device, as compared to single particle manipulation, which suffers from data loss and decoherence.

19 Claims, 12 Drawing Sheets

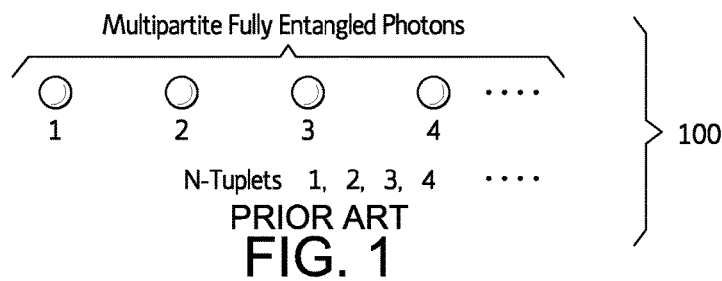
FIG. 1 PRIOR ART
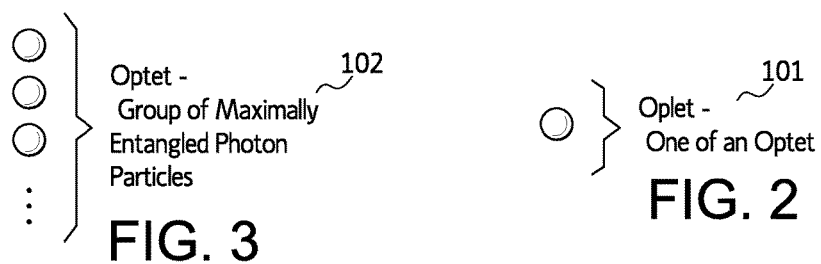
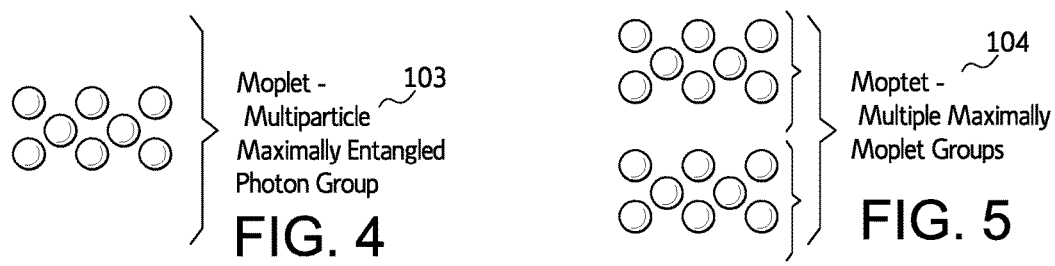
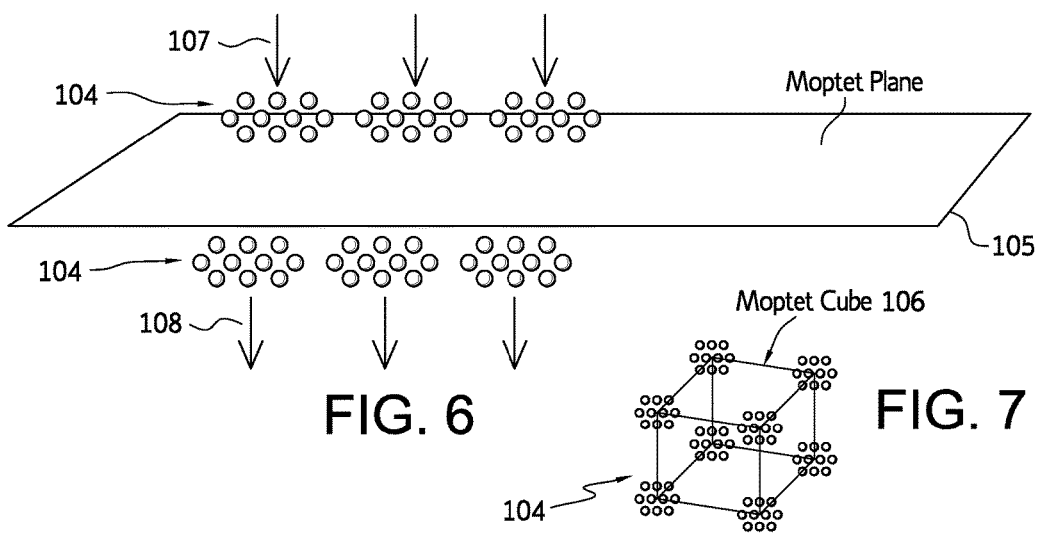

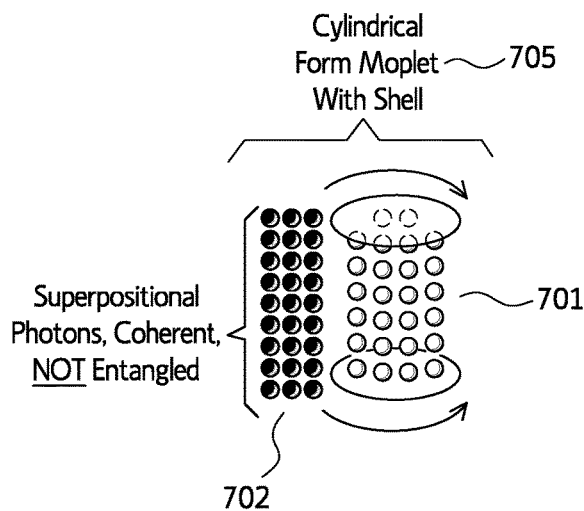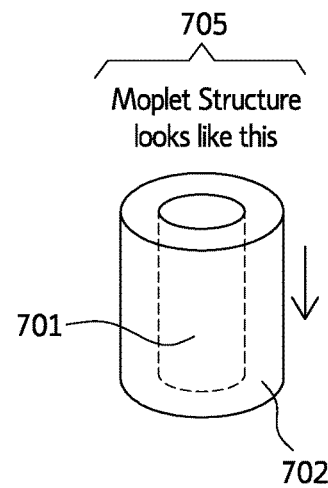
FIG. 23         FIG. 22
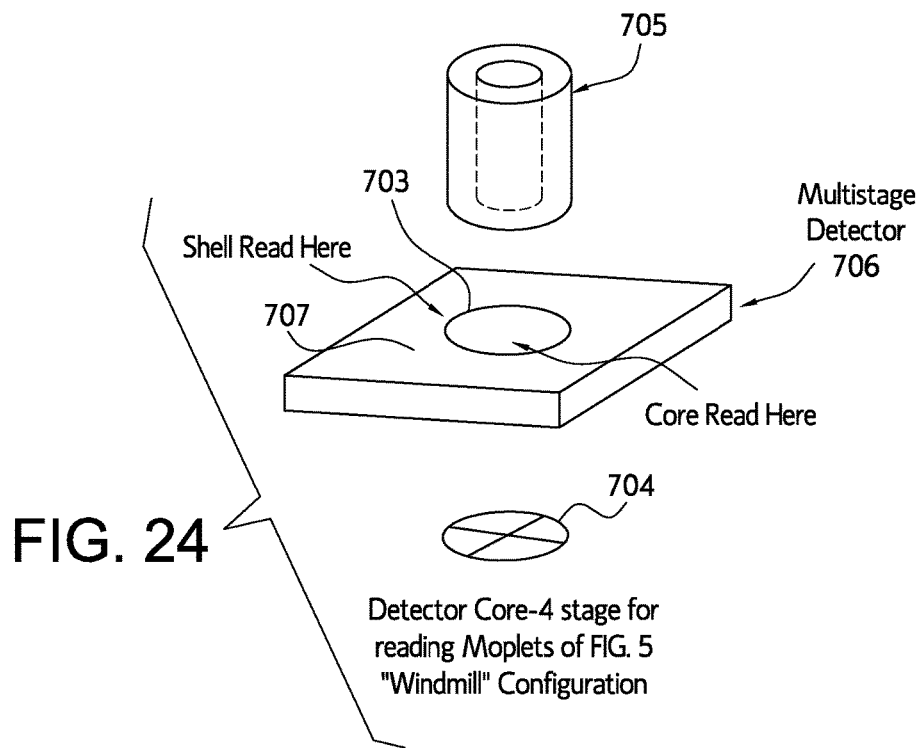
FIG. 24

From 3201 to 3208 signal is received at 3209 from 3201 instantly over ∞ distance

US 10,332,022 B2

SYSTEM FOR GENERATION OF GROUPS OF ENTANGLED PARTICLES FOR INTERACTION WITH COMMUNICATION POINT DEVICES

CROSS-REFERENCE TO RELATED APPLICATIONS

This application is a Continuation Application of U.S. patent application Ser. No. 14/752,758 filed Jun. 26, 2015, and claims the benefit of priority to U.S. Provisional Patent Application No. 62/018,509 filed Jun. 27, 2014, which is hereby incorporated by reference in its entirety.

TECHNICAL FIELD

This disclosure relates to the fields of classic electronics and semiconductors, quantum electrodynamics, particle entanglement, and quantum computing, including photon, coherent light, entanglement, and phenomena associated with very short lived shaped pulses of entangled light.

BACKGROUND

Focus is drawn to the particle effect known as entanglement. The body of background art supporting entanglement is vast. Examples include the early Copenhagen interpretation, the EPR (Einstein-Podolsky-Rosen) paper regarding particle entanglement, to recent publications about entanglement of particles and, more particularly, multipartite entanglement of individual photons. Recent publications surrounding multipartite entanglement relate to maximally entangled photons; reference is drawn to the term-of-art "N-tuplets," defined as a plurality of maximally entangled particles where N=the actual number of entangled particles. Some publications relate to shaping individual photons, as well as achieving attosecond spacing methodologies.

Industry and the research community have proposed logical qubits and various configurations to try to overcome cited deficiencies. Logical qubits means storing a single value redundantly in two or more qubits where the storage method is one particle per qubit. This said, the requirement remains to monitor the particles to detect if the housed value has changed or been corrupted in any one particle, and in some instances, if that corrupted particle can be restored.

SUMMARY

This disclosure provides . . . (insert claims in sentence form with each independent claim being a separate paragraph stating "This disclosure also provides . . . )

Advantages and features of the embodiments of this disclosure will become more apparent from the following detailed description of exemplary embodiments when viewed in conjunction with the accompanying drawings.

BRIEF DESCRIPTION OF THE DRAWINGS

FIG. 1 depicts conventional multipartite entanglement of individual photons referred to as N-tuplets.

FIG. 2 shows an elevation view of an oplet in accordance with an exemplary embodiment of the present disclosure.

FIG. 3 shows an elevation view of an optet in accordance with an exemplary embodiment of the present disclosure.

FIG. 4 shows an elevation view of a moplet in accordance with an exemplary embodiment of the present disclosure.

FIG. 5 shows an elevation view of a moptet in accordance with an exemplary embodiment of the present disclosure.

FIG. 6 shows a perspective view of an organization of moptets relative to a reference plane, in accordance with an exemplary embodiment of the present disclosure.

FIG. 7 shows a perspective view of an organization of moptets in a cube configuration, in accordance with an exemplary embodiment of the present disclosure.

FIG. 22 shows a stylized perspective view of a shelled moplet configuration, in accordance with an exemplary embodiment of the present disclosure.

FIG. 23 shows a stylized perspective view of elements comprising the shelled moplet configuration of FIG. 22, in accordance with an exemplary embodiment of the present disclosure.

FIG. 24 shows views of detectors configured to read moplets in a shell configuration, in accordance with an exemplary embodiment of the present disclosure.

DETAILED DESCRIPTION

Figure 8:
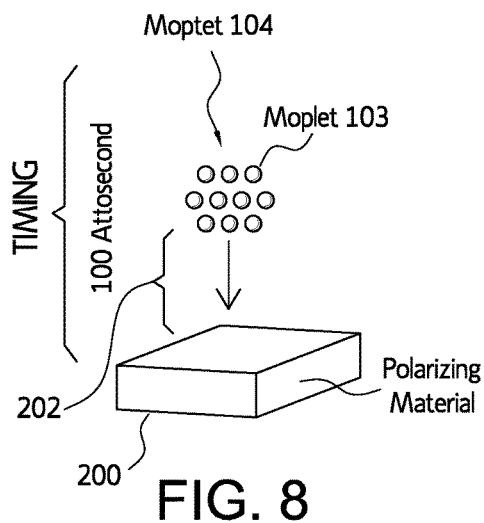
FIG. 8 shows a perspective view of a first timing of arrival of a moplet and moptet, in accordance with an exemplary embodiment of the present disclosure.

The present disclosure is directed to the use of maximally entangled particle groups (an embodiment of which is photons), organized into defined, shaped pulses, and patterns made up of these shaped pulses. Using the system and method of the present disclosure, a first group of maximally entangled particles is maximally entangled with another, second group of maximally entangled particles forming at least two groups of maximally entangled particles. These two groups are maximally entangled inter-group and maximally entangled intra-group.

An exemplary embodiment of the disclosure involves multiple particles making up a single value; e.g., a modulated group state and an indication of the group's state, such as its corresponding voltage if detected, as the state of the group eliminates bit error when viewed in the proper context of this disclosure.

The value of the multiple particles may be any group state, attribute, or specific information contained in the multiple particles. Entanglement for the purposes of this disclosure includes all known entanglement values or states for particles; e.g., photons, with the values or states including polarization, phase, angular momentum, and intensity.

Technically, uniquely entangled groups are organized so there is a known, identified first group, second group, and so forth, inclusive to the last group required by a particular design goal. Equally, other groups not uniquely entangled with the first series of entangled groups, but entangled inter-groups and intra-groups, are utilized, and the same rules apply to these groups. Each independent grouping series will typically represent one quantum "bit" or qubit. The purpose in distributing the value of the qubit, or, as discussed hereinbelow, a v-qubit, across the group is to add stability and to eliminate noise and decoherence, while also providing an opportunity to modulate or read the group and autoteleport (automatically teleport a value without requirement for classical communications and without need for a unitary transformation, rather, using a simple voltage comparison of an end result to determine final value settings in a calculation) a value from one group to another group which was not previously entangled with the group teleporting its value.

Broadly, one can say there are groups within groups. However, more precisely, every group is known as to its existence, its timing, and its place in space time, according to a control plane or some form of fixed known control structure such as a plane, block, cylinder, and sphere, all formed according to a time scale.

The proposed v-qubit is distinctly different from conventional technology. To form a v-qubit, a value is housed or contained in a group of particles, taken as a whole group, and modulated and read as a whole. Because no single particle houses the stored value, i.e., the store value relies not on a single value, the value is logically virtualized into a group and must be extracted from a group. The need to monitor and repair any one particle in the group is completely eliminated. Within that whole, subsets or regions can be defined, relative to a plane, to hold independent values and provide redundancy within the v-qubit, or alternatively, to house multistate logic values in a single v-qubit or both. Hence, there is no need to track individual particles. Instead, the system and method of the present disclosure is focused on creating and tracking a particle group or particle groups. The advantage is that a particle group is exponentially more stable than an individual particle, and the particle group can be protected with further forms of protection as will be revealed below.

The particle groups are in motion and the motion is known relative to a surface or support, such as a plane or a virtual surface or support, which means the control over the motion directly relates to a virtual structure in three dimensional space. The structure to which the groups are related could be a virtual structure, so long as modulation and detection devices can be placed in the proper locations.

Photons already in motion travel straight in clear space without a hyper-strong gravity field nearby, so as to reliably maintain their planar vector when set in motion in the form of a planar vector or trajectory while maintaining the shape of any grouping (pulse or pulse shape). Hence, a plane may be utilized as the control surface or virtual surface for enabling an embodiment of this disclosure.

Whatever gravity source is nearby, the force of the gravity source will typically warp space-time smoothly, so the relative motion of the photons will remain "straight" as to their individual particle/wave vectors. The anticipated motion of each photon and the arranged motion of the groups relative to one another apply to all groups, and the motion of particle groups is leveraged, enabling placement of communication points in the pathway of the particle groups predictively and strategically. This observation is important as a wholly robotic probe in the form of a satellite or space vehicle will find computer systems to be functional in the presence of intense gravity-warped space-time, expanding the range through which the probe can approach complex structures in our universe.

By colliding particle groups of this disclosure with communication points, with the right timing, grouping, and sequencing, values can be modulated into and taken out of any given group of particles. Equally, an end result obtained in one finite entanglement group can be autoteleported to a beginning member of a new finite entanglement group for continued processing or perpetuating the value as a mode of storage, and, as well, to perform switching and movement of data.

Because of the inherent effects of entanglement, the collision of one group of particles with a communication point that is engineered to cause a measurable change in the colliding group, causes an instant permanent measurable change in all other groups entangled with the first group, even when this first group is subsequently destroyed. Deliberate, timed destruction of a group once a value is switched out, can add more stability to the overall system by reducing the risk that the first group will later affect other groups.

Modulation, such as polarization of any non-polarized photon, destructive reading, and non-destructive reading of groups, which may be moplet groups, suggests a communication point technology needed to write to and read from the groups. The shape, relative placement and timing of groups to one another, determines "clocking" as the particles, which in an exemplary example are photons, will all travel at the Planck constant "c" or ~186,282 miles per second. Even the shape of the pulses, consistency of the shaping and the shape of each individual photon comes into play as certain modulations, such as polarization, arguably change the "shape" of an un-polarized photon. However, the major focus is upon controlling the shape of the pulse, each individual photon in the pulse, and the space between pulses.

The moplet or moptet groups need not be collocated. However, colocation is convenient for building a local processing, switching and storing capability for data. Colocation also allows for environmental controls to be centralized providing a stable environment and platform. Colocation is also practical for better controlling the environment in which the particles process, switch, and store data. However, unlike classical electronics, closeness to one another is not necessary as power management and loss as seen in classic electronics as relates to distance between elements of the processor is not an insurmountable or costly concern with this technology.

Photons are discussed herein as an embodiment in terms of particle selection. Also, hereinafter virtual qubits are defined and referenced as v-qubit(s), a single group of photons as a moplet, and a related group of particle groups as a moptet. Moplets may be comprised of a plurality of entangled oplets. It should be noted that conventional N-tuplets are more specifically considered to be individual photons which are maximally entangled with other individual photons. In the present disclosure, single particles which are entangled and formed into groups of single particles per group are referenced as oplets as to one particle of one group, and optets as to a two dimensional set of single entangled particles (oplets) that form a complete group. It should be understood that when organized groups, such as optets, moplets, and moptets are formed, such groups are entangled.

Outside of this nomenclature, individual oplets, optets, moplets, and moptets may still require more organization and distinguishment from one another, such as groups of optets or groups of moptets and groups which preside further above in terms of hierarchy. As one examines how the system and method of this disclosure stores and processes data, it is clear that reliable nomenclature will be of importance as an aid to discussions and system design. The figures assist in organizing nomenclature to assist in understanding this organization methodology.

The virtual qubit (v-qubit) is formed by modulating a value into an optet or, more preferably, a moplet. The value is held until the optet or moplet is destroyed, measured, or, alternatively, the value is passed on to all other members of an optet or moptet, if any remaining members exist at the moment of modulation of the value and if the remaining members are not measured or destroyed until the moment of need arises to extract a value from the optet or moptet group.

Two preferred techniques exist to off-load a value from one moptet to another, those being conversion of the moptet value to a classical value and reintroduction of this value into a new moplet which is a member of a moptet, or, arranging the "circuitry" to perform autoteleportation. Each moptet group is dedicated to holding a value, but the group also possesses the unique ability to switch the value predictably, between members of the group and in a specific order according to the desired timing of the system. If the logic state desired is binary, each oplet or moplet is anticipated to hold a "0" or a "1." The optet or moptet group can also be configured to hold a value of "0" or "1." However, the holding of a value is relative to also knowing that the group was not used to switch the value; in other words, the value of the group must be maintained until the information is intentionally switched to another entity. Switching of values, or value switching, is based on timing and each possible value, "0" and "1," can be switched to "0" or "1" inclusive. This means a "0" can be switched to a "0" or a "1," and, a "1" can be switched to a "1" or a "0" when creating new groups to receive the information. As will be shown below, there is indeed a mechanism present to distinguish if the value extracted from an optet or moptet is a quotient or sum, not just a single value. Hence, any and all binary logic gates can be emulated by design of the communication point array and such design is not limited to a binary or true false logic table; rather, any logic state or N-State logic may be used.

Also, unlike any other design known to Applicant, the system and method of the present disclosure can mix binary with multi-state logic in the same system and the processing of v-qubits can be performed serially, in parallel, and in any combination of these that reduce the processing steps to arrive at the most efficient intended calculation. Logic states of 2 (true false), or 3 and greater are supported; for example, a 10 or 100 state logic correlating to the degree of polarization of the particle groups to a control structure.

As is known to one of skill, when a single entangled particle is modulated to hold a value and the particle was previously entangled with another prior to modulation, this value can be referenced as a qubit. Knowledge of the whereabouts of each particle offers the opportunity to extract the value from either of the two particles if and only if a frame of reference was first established to determine the particle relativity. One form of relating the particle groups to one another is to relate the groups of particles to a planar surface, according to a predetermined timing.

If two-state logic is desired and coherent photons are used as the particles, then polarization of a group may represent a logic state while the superposition (un-polarized) state is considered to be a control or neutral state, much like a transistor without power applied. Inherently, if technology emerges to read a group that is in the superposition state while leaving the state intact, then three state logic may be derived where the superpositional state is one distinct logic state, vertical polarization being a second distinguishable state and horizontal polarization being a third logic state. This observation applies to the observation that a third state exist, that being the superpositional, which can be detected, thus it would be wasteful in design to leave that state out of the potential to use it as a value and expand the processing power per each single cycle in a processing schema. However, it is noted that the superposition state is a condition that is sensitive and prone to collapse into a polarization state in the context of this disclosure. Thus, the polarization states and conditions applicable to whole particle groups are more preferred than using superposition states to represent a value.

There are also other possibilities that arise from the use of moplets that allows for a more sophisticated use of the individual moplet particle group. Moplets can be polarized other than vertical and horizontal relative to a control structure or surface. However, exotic polarization is considered to be a less desirable embodiment only due to the current fact that the speed of processing binary data, using vertical and horizontal polarization within the meaning and context of this system is sufficient to achieve radical processing power, switching, and storage/retrieval speed. However, it is noted that expanding the polarizations (for example setting/varying the angles of polarizers relative to a plane or control structure) could increase processing speeds further by directly supporting multi-state logic.

When discussing polarization, both vertical and horizontal, these conditions are purely relative. In order to establish a frame of reference, so that groups can be continually related to one another, an embodiment of the present disclosure considers the maintenance of a plane upon which all related moplets, moptets, and optets and any further groupings of these are organized. Higher groupings beyond the aforementioned groups can be maintained in the same plane or a different plane. Planar organization is not mandatory but it greatly simplifies knowing which oplet belongs with which grouping, which plurality of oplets forms a given optet or moplet, and which moplets or oplets taken as a whole, form a moptet or optet. It is possible to create a particle group and a group of groups, in the form of a hybrid extension of these teachings. If done, the communication points must operate upon particle groups for every function. The use of single particles, instead of groups of particles, disadvantageously opens the system up to decoherence and noise, and will be more sensitive to the maintenance of a perfect environment.

Contrary to the use of a single small space or region, or a given single plane, we can also use a plurality of planes and spaces which are separated by small, or by vast, distances, according to unique demands and designs. Entanglement provides a unique opportunity to process and calculate even though a vast distance exists between elements of a single difference engine, much like saying a processor could be cut in half, one half sent to the moon, the other, to Houston (NASA) and yet, the processor continues to function completely normal.

The EPR paradox known as "spooky action at a distance" has been demonstrated via exploration of Bell's Theorem, and hence, we can leverage it to provide forms of redundancy and communications, as well as switching and storage, distributed across vast distances and yet, representing single switching devices, engines, or processors.

Generating bursts of maximally entangled photons (or particles) is known to those of skill in these related arts. A careful review of the many experimental platforms reveals that none have disclosed grouping the entangled particles as suggested in the present disclosure, nor have prior experimental platforms disclosed the virtues of the establishment of the v-qubit to the quantum computing field. The stated focus of all of the prior experimentation has been upon use of individual particles and the use of particle entanglement to house data and process data using quantum gates. Generating bursts of coherent light at femto speed and at atto speed has also previously been demonstrated; however, in these instances the particles were not known to be or argued to be entangled within a group wherein the group itself represents a single value, nor where the offtake or intake of the value is performed on all particles in a group at the same relative instant. Hence, the context of the v-qubit as defined herein is considered to be novel and unique, coinciding with the moment of genesis for this disclosure.

More recently, use of ultraviolet lasers has produced bursts of parametric light that existed for only a few hundred atto-seconds, lending support for the generation of entangled photons and photon groups spaced apart from one another with atto speed spacing, pulse duration and both pulse and space shape.

There is an inherent instability in vesting complete confidence in a single particle-based entanglement computation system. Single particles can collide with stray electrons, for example, and a bit error rate is established at greater than zero, which at these processing speeds must be overcome. Vibration, heat, and sound (in the absence of a vacuum) can alter a single particle trajectory past critical thresholds, while a particle group can be directed to a communications point that is more tolerant of the presence of these elements and the whole group can still be reliably read; whereas in the same conditions, the single particle would be lost. The use of groups as described in this disclosure is a crucial distinction from, and advantage over, prior approaches. A mere minute of processing at 1 Trillion-Trillion operations per second suffers greatly if there is a measurable bit error rate within this modicum of calculation, unless a mechanism is presented that can overcome the sources of bit errors for this technology, and eliminate them. The technology, system, and method of the present disclosure perform this precise task, as one of skill will recognize upon review of this specification and its associated drawings.

There is no question that control over the shape, duration, and timing of the pulses, which includes cadence and is related to the shape of the pulses, will serve to eliminate any additional sources of decoherence in a given system. Cadence can include symmetrical or regularly spaced, and non-symmetrical or irregularly spaced spacing or intervals. It should be understood that the cadence is generated during creation of entangled particles, so the symmetrical or non-symmetrical configuration is predetermined. Shorter duration pulses and spaces, such as pulses created by light of shorter wavelengths, for example, extreme or deep ultraviolet, are more difficult to achieve, and yet, the elimination of decoherence from the system will track from longer timing to shorter timing as it will relate more to the number of particles in a given pulse and control over timing and pulse shape.

Whatever reduced error rate single particles could ever have, even in an ideal system for single particles, using a group of particles and applying a value to the whole group, then taking the average value of the whole particle group as taught by the present disclosure, increases reliability of the modulation and reading, especially when the modulation mechanism repeatedly modulates a vast plurality of the members of a group. If single particles are "X" reliable, then N particle groupings used to represent one value (the group's value representing a single v-qubit) are at least "N×X" reliable. In example, using 1000 photons in a group, there is a very clear advantage in the reliability factor as a group of 1000 photons would be 1000 times more reliable than using one particle per qubit. If the underlying single particle modulation and reading technology improves, this improvement will instantly apply to the grouping concept presented here.

Certain elements of this design assure a particle group is modulated in whole. So, if a particle group contains 1000 photons and all 1000 are modulated, when read, the final value will be such that any photons, which were errantly switched back to a contrary value during a time frame of this event, are undesirable. However, this event still does not affect the final reading or detection of the value of the proposed group. First, almost half the group would have to be changed during this critical time period to affect the final reading of the group adversely. Second, this system can detect whether any photons of the plurality forming the group were affected, thus indicating an impediment in the system. The true rate of loss of a single photon value is less than 1 in 1 trillion in a controlled environment, and the system only relies on a photon holding a value for, in an exemplary embodiment, 10,000 femto seconds. However, there are elements that may enter into a system and change this figure. By using groupings of a plurality of photons, where each group has a pluralities of photons that house only one value, this bit error is substantially minimized and measurably eliminated, thereby changing the calculation of potential bit error to ~"n" factorial, where n=number of particles in a group. The chance for bit error is thus essentially eliminated in whole from the processing system, particularly if just a 1% mutilation effect is observed, and dynamically considered to be enough to further examine the system and eliminate any source of "noise." This increased probability of noise could happen, for example, during times of peak solar flares for such a device in orbit and not protected by an atmosphere. However, a 1% or even 10% mutilation effect is nominal and transient, and does not slow the system while permitting processing at "0" BER (Bit Error Rate). It is very interesting to consider the power and capabilities of the v-qubit presented here in that the single value applied to the group provides many subtle yet important advantages. No other computing system can continue to operate while observing and even quantifying mutilation of carriers with no degradation of performance. The observation and quantification has no deleterious effect upon the system until mutilation approaches 50% of a given moplet. Such conditions should not occur unless there is great contamination or damage to a system. Interestingly, the shift in anticipated voltage or detectible voltage pattern is detectible even at only 1% mutilation or degradation of the moplet, because the use of a group of particles to represent a single value and the ability to measure the voltage output of the group as compared to a single photon.

The design and composition of communication points can leverage certain characteristics of redundancy within the device, forming one of the causative factors in eliminating bit error, entirely. Whereas, measuring single photons is conventionally performed by a cascade counting device and a pre-determination as to polarization (polarizing filter before detector), in contrast, measuring photon groups in accordance with the present disclosure allows for the slight or small percentage of particles of the group not making it to the final detector, while still registering the correct value. As compared to conventional multipartite experimentation with, for example, three, four, five and eight individual photon entanglement, using the v-qubit system and method of the present disclosure, the fidelity of the v-qubit is optimized since single photons of a group, e.g., a moplet, may vary in any group without creating bit errors because a threshold value is used as a binary "0" and "1" rather than the arrival of a single photon polarized in a single polarity. The statistical probability of one method versus the other delivering a bit error, is vastly different in favor of the group.

Quantum computing, to date, has not been demonstrated as being more reliable than semiconductor-based computing. The use of v-qubits used in the context of this disclosure changes this observation. Group sizing and communication point design, as well as the design of the photon source and group forming mechanisms, will yield bit error free computation at vast speeds. The parameters of material selection, fabrication, purity, thickness, photon frequency matching to materials and thickness of materials, and similar factors affect group sizing, communication point design, forming mechanisms, etc. Hence, the communication point can be constructed to be tuned to the frequency of the photons in use, yielding higher percentages of polarization to a group, measurement of a group and conversion of a group's arrival to a value, such as a specific voltage or voltage pattern related to the arrival of the group and its complete conversion to a voltage or voltage pattern coinciding with the end member of a given group's arrival (e.g., the last moplet in a moptet).

Although it has been suggested that entangled particles cannot be clandestinely measured without alerting overseers of the transmission, this theory has recently been proven to be fundamentally incorrect. Entangled particles can be measured without affecting the other particles in the group, somewhat reducing the hoped-for effect of intrinsic security at the particle level. The system and method of the present disclosure provide other approaches to encrypt and protect transmissions and data, which will be seen as an ultra-high state of certainty and secrecy due to other effects generated by the specific organization of moplets, oplets, moptets and optets, and data modulation methodology that can be applied to a moplet or oplet. One such technique would be to introduce Trojan horse processing, switching, and storage that suggests that to clandestinely observe any portion of a system, one would need to know where to be and at what moment to tap into intelligible data. This technique can include physical pathways as the pathway in question, carrying valid data, can be randomized and not repeated.

The conventional single particle reliance is less preferred than the system and method of the present disclosure, using two particles to hold one value doubles the reliability and allows for single bit error detection. Thus, using three particles to represent one value triples the certainty of the held value generating the basic statement that using N particles to represent one value, increasing the reliability of the held value by N. Improvements in single particle fidelity automatically apply to the multiple particle grouping, or v-qubit of this disclosure, as one of ordinary skill in this art should observe.

As will be further discussed, there are measurements of a group that can be performed that will determine several factors about the group. These factors include, but are not limited to, naturally occurring data loss (noise generated by the environment), bit error, and clandestine attempts to intrude upon a given transmission. Another factor inherent to the design is the use of a whole group to gather a single stored value (moplet versus oplet) and taking a measurement of the group over a very short window of time, such as an atto-second. The final measurement and the end of a series of process steps may be done in classical electronics. Hence, there will be a voltage gathered, and this voltage will indicate polarization and may also explore a degree of polarization outside of exclusively "vertical" and "horizontal" relative to a plane. Moplets may also offer combination effects as they are formed of many particles in a specific, defined, or known group. An example would be a degree of polarization and a percentage of particles polarized. The shape of the group could form yet another measurable factor that is distinctly measurable outside of polarity and percentage of polarity of a given group.

The polarization of a given moplet or oplet in angles other than 90 degrees or 180 degrees, such as 45 degrees or 12 degrees, that is, per se, "non-linear" polarization, may be determined, opening up the system to multi-state logic. Another popular nomenclature is N-State. The system and method of the present disclosure can easily handle 3-state logic and higher, wherein modulating moplets or oplets using, for example, 100-state logic, would form a more preferred embodiment for advanced computation applications, such as working with very, very large number calculations.

As is very well known to those of skill, achieving 100-state logic allows for greater computation power in less machine cycles. Although the present disclosure does not have external clocking in the sense of classical electronics, moplets and oplets, and moptets and optets, are timed to one another, by way of their reliable movement at the Planck constant "c" and the controlled spacing and timing of the groups, forming an intrinsic "built in" clocking.

The speed calculation of the system and method of the present disclosure, how fast the systems and methods of the present disclosure can process, switch and store data using moptet and optet busses formed of 128 moplets or oplets, calculates to a minimum of 209 Billion-Trillion calculations per second. This calculation assumes femto-timing of the moplets and oplets, one to the next. Atto timing would greatly increase the processes per second ton the equivalence of over 1 Trillion—Trillion bit calculations per second. This speed calculation is based on binary use, two-state logic. Designing 5 cores using this same design repeated 5 times and vesting data across the 5 cores, one can achieve processing speeds of 1 Trillion—trillion calculations per second under a femto pulse timing scheme. Running 8 cores, one could emulate a classic "byte" in the context of 8 bit processing, and so on. Hence, even at 128 bits per byte, running 128 cores would allow the apparatus to process serial data at 209 billion trillion BPS.

Take the logic state to 3-state, the speed increases accordingly. At 100-state logic, the speed is vast, eclipsing the above speed threshold by at least another billion-fold. Also, the logic table for 100-state logic allows for process re-engineering which will take a binary process or lower order N-state process and increase its calculation speed more than just the difference in logic state storage and linear calculation improvement. The systems and methods of the present disclosure also offer the ability to atto-second time the pulses, thereby achieving at least another 1000 fold increase in speed.

The systems and methods of the present disclosure will yield a demand for a new operating system design, conversion of all elderly operating systems and data structures into a more universal framework, and then, improvement in use of the logic table, for example for 12-state logic, to build better assembler routines (cold boot load, base operating system) and various layered operating systems and languages. In fact, Applicant foresees more than one competing operating system in this environment to take advantage of the vast processing speed and to improve upon and detect flaws, errors, viruses and other anomalies within a whole, single processor. Such an environment can run more than one operating system, concurrently. Interestingly, at these speeds, one could conceivably run all versions of all operating systems ever made, simultaneously. The advantage of such simultaneous operation is to allow the porting of all programs from their elderly environment to this modernized quantum computing environment.

With a robust modification to the moplet, specifically, a new form of hyper-secure protection is realized. The modification involves modulation of only the core of each pulse, leaving an outer shell of particles, in this example, photons, which are still in their superposition state and not entangled whatsoever. A slight air gap between the outer shell and inner core may be required. It is also possible to trail the moplet with a sealing cap of superpositional light.

The modulation of the core of a pulse while leaving an outer shell in superposition provides an interesting and functional intrusion detection mechanism. Detectors can independently read and report the shell value in terms of an anticipated voltage value independently from the core and its value or polarization(s). Aside from intrusion, the systems and methods of the present disclosure will provide for and report noise intrusion should it appear from the environment, or, a breakdown in the physical components of the quantum computer. The shell surrounding the particle groups could also be presented as a continuous tube that would provide utterly steady voltage from which there should be no deviation or, intrusion is likely the cause aside from accidental contamination.

The technical problems these systems and methods of the present disclosure overcome are multi-fold. The problems targeted are those surrounding the field of computing, more particularly quantum computing, and further still, overcoming the sensitivity and instability (or decoherence and combinations of these issues) of using single particles for housing qubits and calculating differentials such as addition and subtraction. Decoherence and noise in systems comprised of single particle qubits seem to pose the greatest impediment, particularly when considering the processes per second attainable with this novel "circuitry" as suggested herein, supporting a trillion-trillion operations per second. Note that the configuration of the v-qubit can take on multi state logic, including serial and parallel processing of same, increasing the total binary operations per second, above 1 trillion-trillion, in a linear fashion. Those of skill are well familiar with the various problems encountered when computing using commercial off-the-shelf classical (transistor or semiconductor-based) products, or the current commercial specialized computers such as quantum computers and Supercomputers. The inventions of this disclosure can be adapted to support greater speed, bit error elimination, bit error detection per bit, and enable superior design in processing, enable redundancy of hardware, and enable redundancy in software. Hardening against intrusion and knowing that intrusion has taken place are also key concerns, and the systems and methods of the present disclosure will address these concerns with a robust solution.

When processing at 1 trillion-trillion operations per second, any solution proposed must overcome the simple observation that a small bit error rate will at least partially impede the usefulness of the design. Therein, one or a few bit errors in each second of processing could be tolerated, particularly if they could be detected and corrected. This said, total elimination of bit errors would be ideal while retaining error detection capacity. Moptet and moplet formats can be structured to achieve zero errors per second.

Add to the previously described challenges the difficulty of processing in harsh environments, such as in space, and the extremophile will appreciate the ability of the systems and methods of the present disclosure to handle and reduce the interfering effect(s) caused by such external annoyances as radiation and intense gravity fields.

The design of a system in accordance with exemplary embodiments of the present disclosure should embrace redundancy to the fullest extent possible. Further, the system should include a calculation at strategic points to detect interim bit error. The redundancy is configured to support serial, parallel, and hybrid serial-parallel processes; e.g., serial-parallel-serial, parallel-serial-parallel, and so on, inclusive of the use of multi-state logic. Pyramidal processing, both in two and three dimensions, is supported by the configuration of moplets and moptets. Pyramidal processing is a form of cascade processing that may be useful when performing mathematics, and may be particularly useful for factoring, particularly when the numbers of interest are vast in size, or, the calculation simply requires a large multitude of steps and/or repetitive steps. See, for example, the description below relative to FIG. 9.

Instant reconfiguration will be an achievable feature of this system, creating a structure that can process data serially, in parallel, in mesh and block forms or combinations of these on demand, ad hoc. The systems and methods of the present disclosure address all of the above attributes and more.

The systems and methods of the present disclosure advantageously provide radical improvement in speed, performance, reliability, redundancy, spontaneous reconfiguration, bit error detection at the bit level, improved avoidance of clandestine intrusion, and incorporation of all previous computation methods and operating systems as well as data structures.

Atto-second physics, the study of atto-second phenomena, points to yet another improvement as derived from the known effect of UV light generated in certain settings wherein the creation and destruction of photons at these wavelengths lasts only a few hundred atto-seconds. Harnessing these effects as a moplet or oplet coherent light source, processing speed leaps to even higher processes per second, as pulse shape and timing relative to another pulse becomes shorter and shorter, or "more compact," as will be shown herein.

Aside from generating coherent light, of which very little is needed in terms of typical laser output, the systems and methods of the present disclosure can operate at normal room temperatures and all temperature ranges for which the communication point technology can maintain function and calibration, while leveraging pure quantum entanglement as a storing and processing device. Current commercial quantum computers typically leverage particle spin, storage, and value processing, which conventionally mandates supercooling. The elimination of superconducting wires by use of the system and method of the present disclosure eliminates the need for supercooling, which is seen as an improvement over conventional quantum computers. The sizing of communication points can also add thermal stability by allowing for oversizing of a detection area to assure detection of particle groups in a range of environmental temperatures. Note that communication points are typically detectors or modulators.

Although discussed in the context of photon entanglement, and what is commonly referenced as "multipartite entanglement" between photons, this disclosure is not intended to be limited to photons, rather, to any entanglement present between any atoms, particles, or particle/waves, the latter description being a form commonly used to characterize the photon.

The present disclosure includes a first group of photons comprising coherent light, maximally entangled, and collocated wherein the group is known as to its relative size, shape, and location in space and in time. A second group of photons apart from the first group may be provided comprising coherent light, maximally entangled, collocated wherein the second group is known as to its relative size, shape, and location in space and in time. The first group may be maximally modulated to house a single value, wherein the single value is the functional equivalent of a qubit. An outer and an inner shell of photons of a known size, shape, and position may be provided wherein the outer shell is in continual superposition until destruction while the inner shell may be in superposition or selectively modulated to carry a virtual qubit value. The modulated portion of the inner group may be further subdivided into segments to carry more than one virtual qubit value.

The present disclosure also provides a first group of photons and a second group of photons comprising coherent light, and which are maximally entangled intergroup and intragroup, wherein the first group and the second group are known as to their relative size, shape, and location in space and in time.

The present disclosure also still further provides collision of a group of photons comprising coherent light, maximally entangled, collocated in a group wherein the group is known as to its relative size, shape, and location in space and in time, and, when the collision is with a structure, surface energy field or particle group so as to alter the group in a measurable way.

The present disclosure also provides collision of a group of photons comprising coherent light, collocated in a group wherein the group is known as to its relative size, shape and location in space and in time, and, wherein the collision is with a structure, surface energy field, or second particle group so as to alter the first group, the second group, or both, in a manner able to be accurately measured thereafter.

The present disclosure still further provides collision of a group of photons comprising coherent light, maximally entangled, collocated in a group wherein the group is known as to its relative size, shape, and location in space and in time, and, when the collision is with a structure, surface energy field or second particle group so as to measure the first group or the second group in a non-destructive way.

The present disclosure also provides collision of a group of photons comprising coherent light, collocated in a group wherein the group is known as to its relative size, shape and location in space and in time, and, wherein the collision is with a structure, surface energy field or second particle group so as to measure the first group and the second group in non-destructive way.

The present disclosure yet also provides collision of a group of photons comprising coherent light, maximally entangled, collocated in a group wherein the group is known as to its relative size, shape and location in space and in time, and, wherein the collision is with a structure, surface energy field or second particle group so as to measure the first group or the second group in a destructive way.

The present disclosure further provides collision of a group of photons comprising coherent light, collocated in a group wherein the group is known as to its relative size, shape and location in space and in time, and, wherein the collision is with a structure, surface energy field or second particle group so as to measure the first group or the second group in a destructive way.

The present disclosure also provides a structure, surface, or energy field comprising atoms that predictively interact with an entangled particle group upon proximity of the entangled particle group nearing a zero distance to the structure, surface, or energy field.

The present disclosure further provides a structure, surface, or energy field comprising sub-atomic particles that predictively interact with an entangled particle group as the entangled particle group nears a zero distance to the structure, surface, or energy field.

The present disclosure also provides a plurality of structures, surfaces, or energy fields comprising atoms placed in pathways assuring a later introduced different particle group in synchronous motion which are maximally entangled, must predictively collide with, and thus interact with, the structures, surfaces or energy fields.

The present disclosure also provides a plurality of structures, surfaces, or energy fields comprised of sub-atomic particles, placed in pathways assuring a later introduced different particle group in synchronous motion that are maximally entangled, must predictively collide with and thus interact with the structures, surfaces, or energy fields.

An embodiment of the present disclosure includes two different moptets which are introduced into communication points designed to entangle the moptets into a single moptet.

Referencing FIG. 1, conventional full entanglement of individual photons is depicted as a plurality of multipartite maximally entangled particles 100, arranged in a known order wherein each individual particle could be referenced as an N-tuplet. However, the present disclosure is directed to groups of maximally entangled particles, e.g., photons, wherein the groups are maximally or fully entangled with other groups of maximally entangled particles.

FIGS. 2-7 depict the formation of groups of maximally entangled particles of the present disclosure in various states and groupings along with the identification of organizational nomenclature. As shown in FIG. 2, an oplet 101, although not referencing a group, is the term used herein to refer to a single photon of a group of maximally entangled photons to be entangled with another group of maximally entangled photons. An optet 102 is shown in FIG. 3 and is defined as two or more maximally entangled photons (oplets) which represent an entangled two dimensional grouping. A moplet 103 is shown in FIG. 4 and is defined as a single maximally entangled three dimensional group or it can also be a maximally entangled grouping part of a larger series of maximally entangled groupings. A moptet 104 is shown in FIG. 5 and is defined as two or more maximally entangled photon groups which represent a wholly entangled series of groupings.

A plane 105 is shown in FIG. 6, exemplifying the anticipation that structure is necessary to organize v-qubits in their respective processing order, as the embodiment requires the photons to be in motion and coordinated with one another in order to facilitate the storage, switching, and processing of information. Note that plane 105 is a physically defined plane or reference location, though not necessarily tangible, and is a reference plane that is at least transverse to the direction of travel of moptets 104, and, by extension, moplets 103, optets 102, and oplets 101. In an exemplary embodiment, plane 105 is perpendicular to the direction of travel of moptets 104. Plane 105 can also be parallel to the direction of travel of moptets 104, which can be useful in configurations where travel along a plane allows moptets 104 to move to a specified position in space, such as where a prism or detector can be located.

A cube 106 is shown in FIG. 7, exemplifying the anticipation that structure is necessary to organize the v-qubits in their respective processing order, as the embodiment requires the photons to be in motion and coordinated with one another in order to facilitate the storage, switching, and processing of information. Cube 106 shown in FIG. 7 is an example of an anticipated three-dimensional moptet structure rather than two dimensional, meaning, rather than limiting the embodiment to planes, we can process any moplet so long as we know the intended organizational structure of all oplets, optets, moplets and moptets. The layout of the moptet can be organized according to, but not be limited to, planes, spheres, cubes, cones, cylinders, curvilinear surfaces, and other structures.

Figure 9:
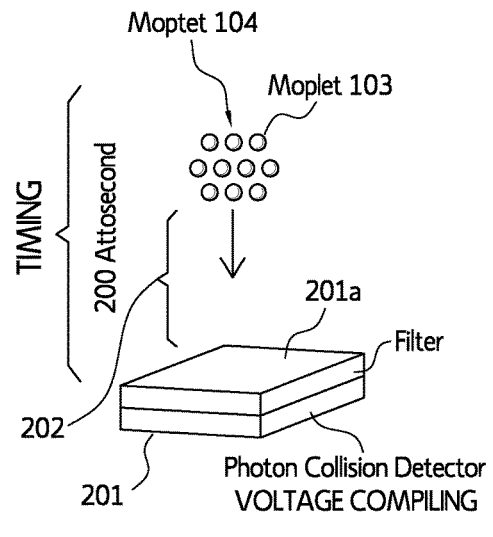
FIG. 9 shows a perspective view of a second timing of arrival of the moplet and moptet of FIG. 8.

FIGS. 8 and 9 illustrate a given moplet 103 and moptet 104, according to the difference in arrival at a communication point structure 200 where the difference in time of the arrival of particles is shown as 202. A voltage compiling detector 201 and a filter 201a are formed of materials known to those of skill in the art, and the materials are configured to detect groups of photons, converting the groups of photons to values comprising a voltage and current. Voltage compiling detector 201 and filter 201a form a communication point. The final voltage and current can be taken as a value by classical computational electronics useful to load in and remove values from this v-qubit processing method. Polarizing materials can take on different functions based upon their design, e.g., linear, elliptical, and circular polarizers, and will typically make up the physical components of quantum gating necessary to perform modulation of a v-qubit and hence, its informational contents.

Figure 10:
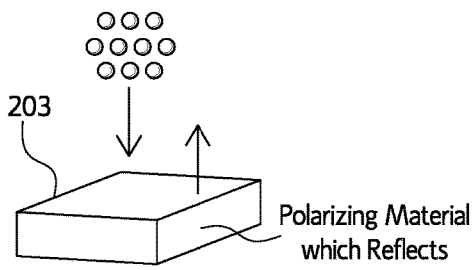
FIG. 10 shows a perspective view of a polarizer configuration of a communication point, in accordance with an exemplary embodiment of the present disclosure.
Figure 11:
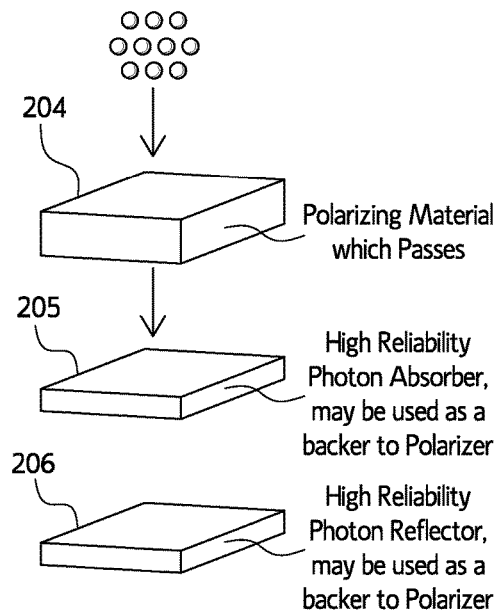
FIG. 11 shows a perspective view of another polarizer configuration of a communication point, in accordance with an exemplary embodiment of the present disclosure.

Multiple polarization configurations can be used in different systems. For example, as shown in FIG. 10, a polarizing material 203 is configured to polarize incoming light (i.e., photons) on reflection of that light, and acts as a communication point. As shown in FIG. 11, another material 204 is configured to polarize light passively, which then uncouples the light from other moplets while preserving the information in the other moplets. Another material/layer 205 is configured to absorb photons and end their existence as photonic particles or waves regardless of being polarized or purely in a superpositional state, which prevents coupling of any changes in state from the moplet to any other moplet. The combination of polarizer 204 and layer 205 is a communication point.

As another alternative, also shown in FIG. 11, a material/layer 206 is a reflector achieving maximum reflection efficiency through tailoring of the material, its purity, and its thickness to that of the wavelength of the selected base coherent light frequency. The reflected light can be used for other processing, and potentially to further monitor the status of associated maximally moplets.

Figure 12:
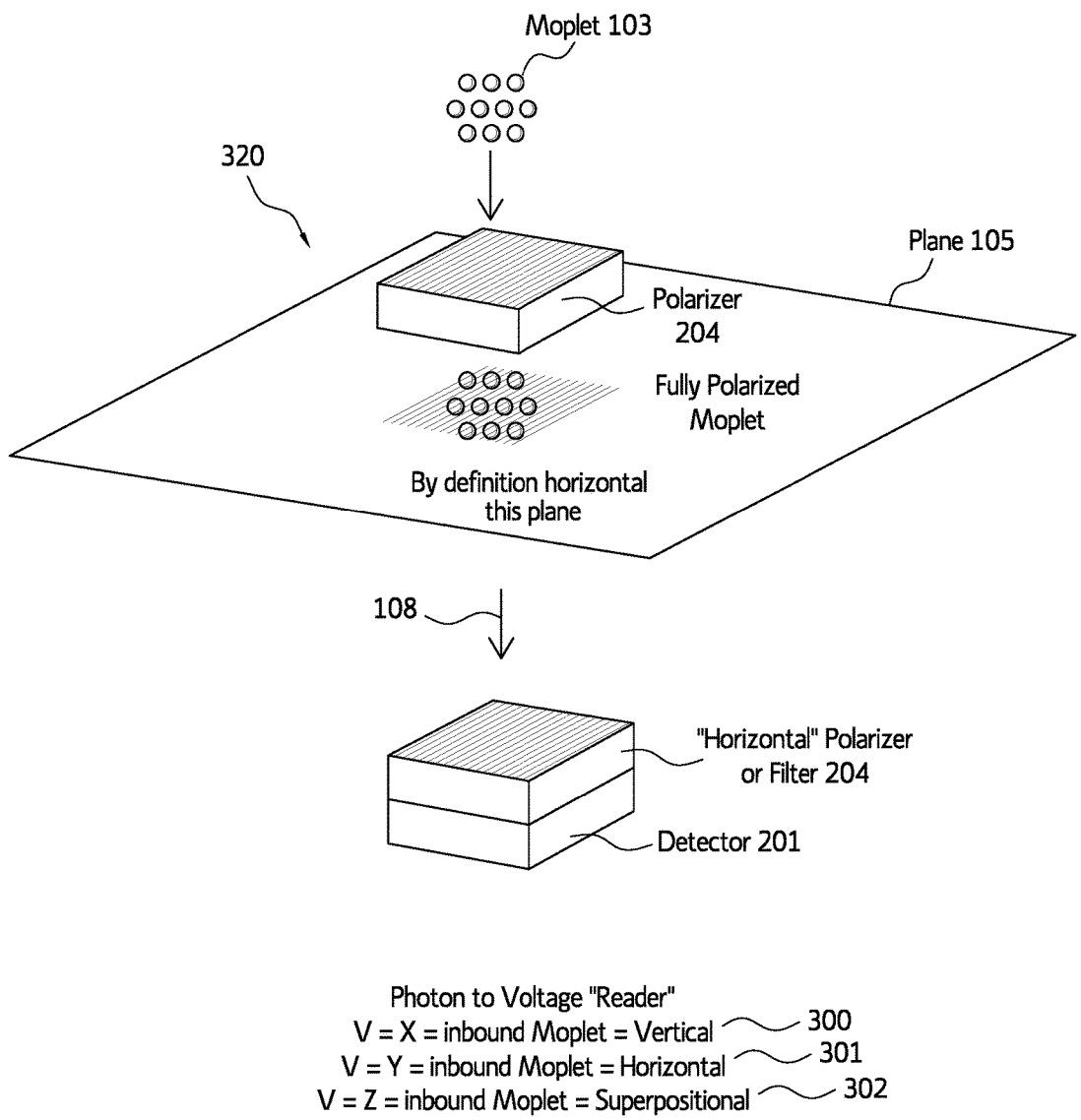
FIG. 12 shows a perspective view of how moplets or oplets collide with and pass through, reflect from, or are absorbed, at communication points and various communication point species, in accordance with an exemplary embodiment of the present disclosure.

FIG. 12 depicts a communication point in accordance with an exemplary embodiment of the present disclosure, and indicated generally at 320. Communication point 320 relates all the previously discussed elements to demonstrate the need for a relative structure in order to allow for storage and retrieval of values into and out of the v-qubits. Detector 201 present on plane 105 is configured to pass a plurality of voltages 300, 301, or 302 to conventional electronic circuitry for processing the voltages to determine the information content of the detected photons. The voltage measurement will determine the final value, e.g., "1" or "0," of the v-qubit in terms of vertical 300, horizontal 301, and superpositional 302. It should be noted that exotic loading and exotic values can be detected, such as using individual v-qubits for non-linear polarization for multi-state logic and designing detector 201 appropriately to pass a known, predetermined voltage based on the value contained in an arriving v-qubit. For example, a detector could be configured to detect circular polarization, and the degree of polarization yields varying voltages, and the detector is configured to provide discrete outputs for the degree of polarization. In an exemplary embodiment, the degrees of polarization can be configured to provide hexadecimal values based on 16 ranges of linear, circular, and elliptical polarization. Hence, movement from binary into multi-state logic, using groups of subatomic particles and atoms, is easily and readily supported. Methodologies for manipulation of maximally entangled groups at a communication point include the use of polarization as a modulating mechanism for groups of subatomic particles and atoms, repeat re-polarization for groups of subatomic particles and atoms to engender multi-calculation processing, both interim and output, and the use of polarization for groups of subatomic particles and atoms (and associated materials which polarize naturally) to form quantum logic gates.

Figure 13:
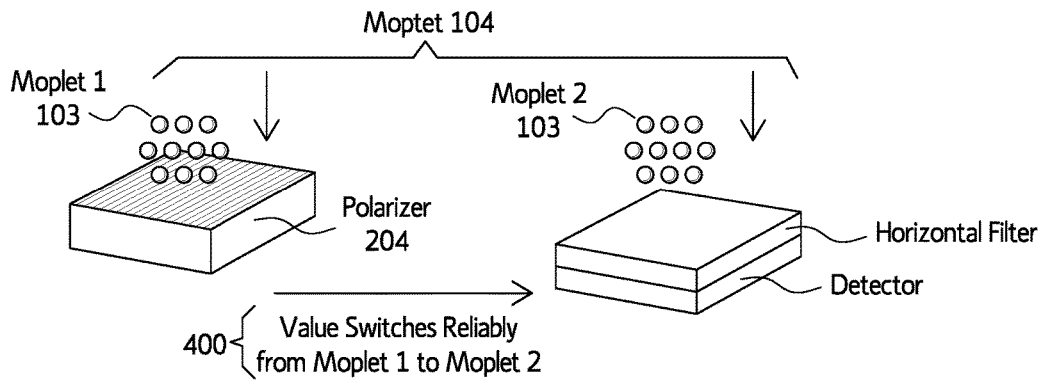
FIG. 13 shows perspective views of moptet pathways to communication point structures, in accordance with an exemplary embodiment of the present disclosure.
Figure 14:
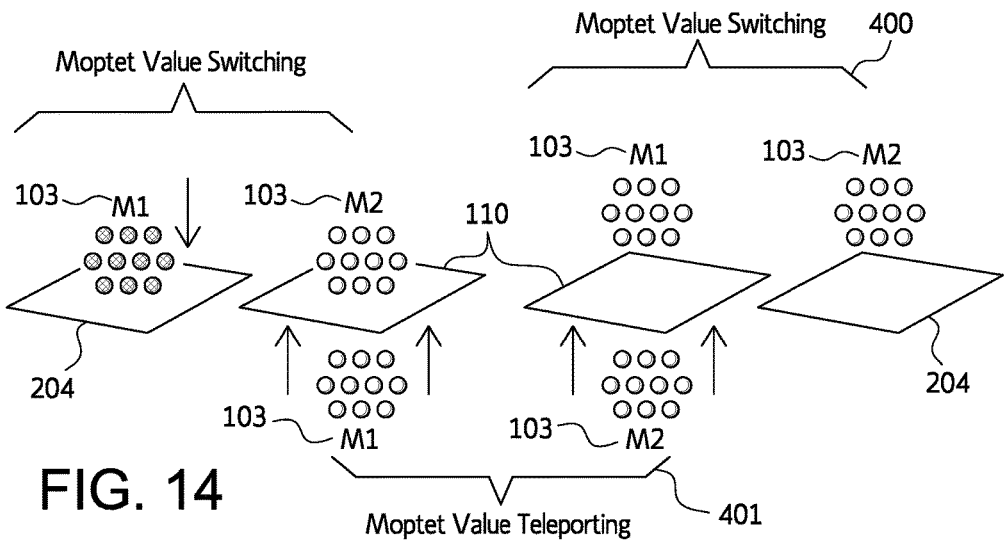
FIG. 14 shows perspective views of additional moptet pathways to communication point structures, in accordance with an exemplary embodiment of the present disclosure.
Figure 15:
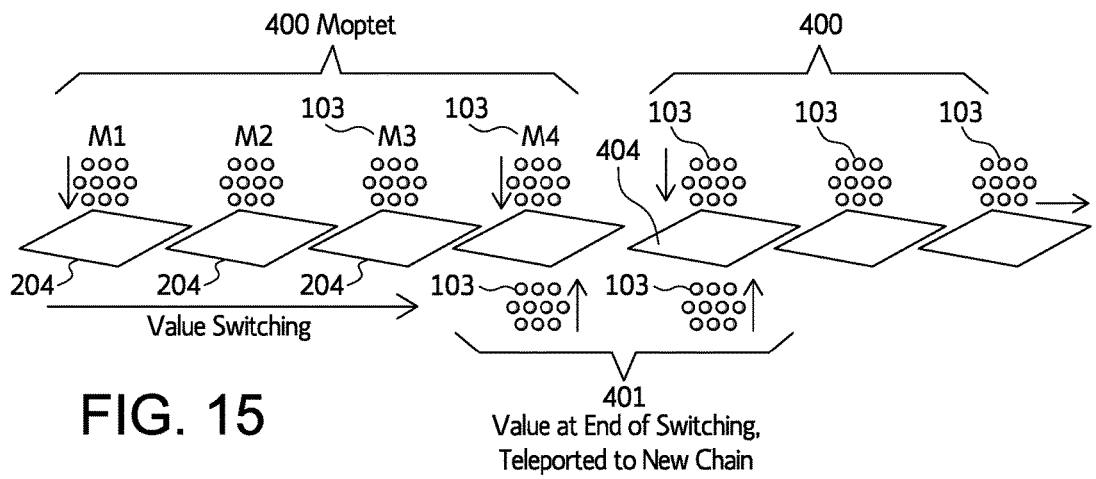
FIG. 15 shows further perspective views of moptet pathways to communication point structures, in accordance with an exemplary embodiment of the present disclosure.

FIGS. 13-15 demonstrate value movement from one moplet to the next, within the frame of a moptet, indicated at 400, each of which is interacting with a communication point. It should be apparent that values combine to form information. For example, each value can be a "1" or a "0," but a plurality of values forms information, such as numbers, letters, symbols, etc. It should also be apparent that the term "movement" in this context means transfer or "switching" of values from one moplet to another. Direction is shown from left to right.

Only two steps are shown in FIG. 13. Hence, the moptet depicted has only two moplet members. FIG. 14 shows one moptet grouping switching a value left to right, where the value is teleported or transferred across the barrier, without any direct contact or any known energy transfer, between moptets to a new moptet. The arrival of photons colliding with a mediating material, which in an exemplary embodiment of the present disclosure can be a single atom or cluster of atoms, such as rubidium atoms, in a quantum well 110, that permits interaction of two groups of photon moplets, which allows information from one photon moplet group to pass to another photon moplet group without violating the "no cloning hypothesis." Timing of moplet interaction with any element of a system, such as the mediating material, is an important factor, as well as the mediating material and the photons of the moplet being coherent one to the next, which also requires that the photons have the same wavelength. If all the conditions described herein are optimized as described herein, the polarization state of one photon group, such as via polarizer 204, can be passed on to another via entanglement. Hence, the value is teleported and the no-cloning hypothesis of modern quantum physics is not violated. The facilitation of this feat is controlled by the timing of the moplets each to the other, the placement of the polarizers and the use of a suitable prism, quantum dot or quantum well technology to allow moplets to transfer information content through observation, where the moplet energy fields predictively cross in proximity well enough to induce new maximum entanglement. FIG. 14 is a two member moptet passing value from left to right to a new two member moptet.

FIG. 15 shows a four member moptet passing value from left to right to a new three member moptet. In FIGS. 13-15, timing of the moplets requires that they each arrive at their contact point at different moments in time and should be viewed as each moplet arriving after the other, from left, to right. The spacing in terms of time should be equal for each moplet one to the next, and as close as possible to the end of one arrival to the beginning of the next group's arrival with enough spacing to assure no cross talk between moplets or overlap. One moplet must arrive and complete its arrival with a slight space in timing before the next moplet arrives, even if this space is only one atto second or less.

Figure 16:
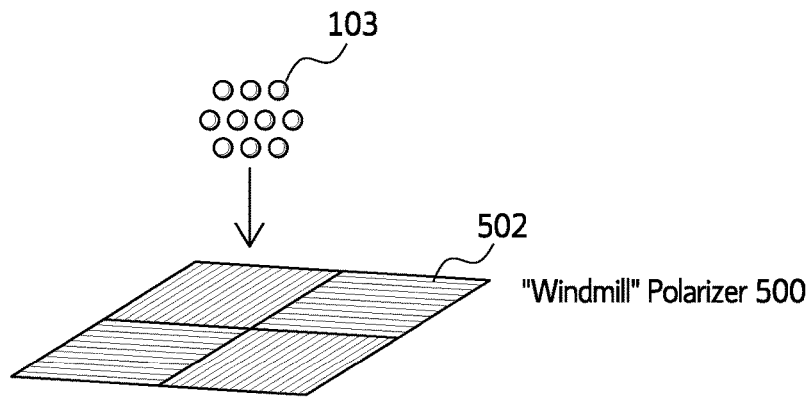
FIG. 16 shows a perspective view of a moptet path to a polarizer, in accordance with an exemplary embodiment of the present disclosure.
Figure 17:
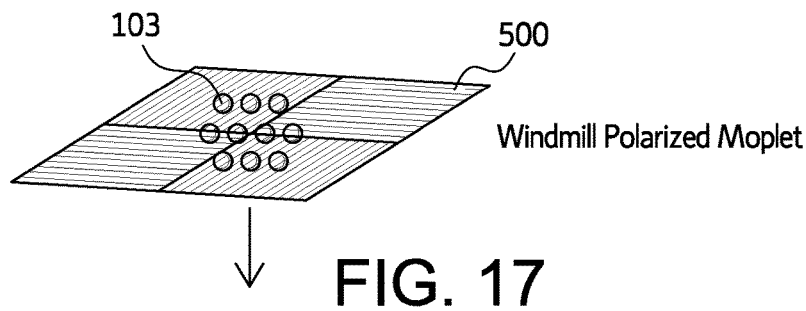
FIG. 17 shows a perspective view of the moptet of FIG. 16 interacting with the polarizer of FIG. 16, in accordance with an exemplary embodiment of the present disclosure.
Figure 18:
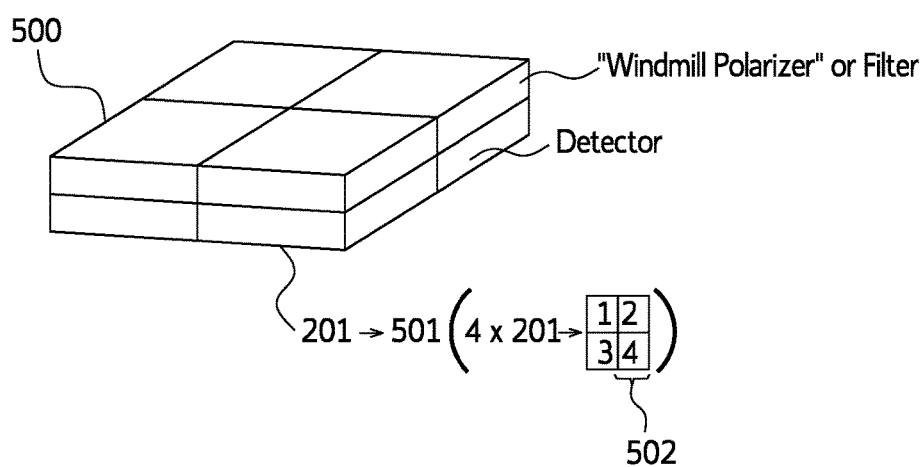
FIG. 18 shows a perspective view of a communication point device incorporating the polarizers of FIGS. 16 and 17, in accordance with an exemplary embodiment of the present disclosure.

FIGS. 16-18 introduce a quad communication point device that includes a new kind of polarizer 500, which is formed of 4 polarizers merged into one, hence the use of a windmill pattern that may be any orientation per a wind segment 502. The detector previously shown as 201, is shown as detector 501 made of 4-201 detectors and will off-load four distinct v-qubit values at the same moment in time.

Figure 19:
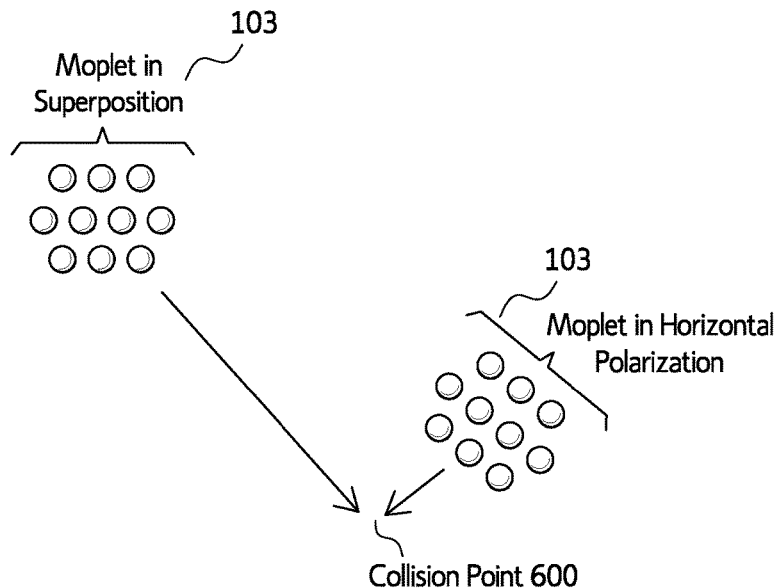
FIG. 19 shows a view of a stylized interaction between two moplets at a collision point, in accordance with an exemplary embodiment of the present disclosure.
Figures 20, 21:
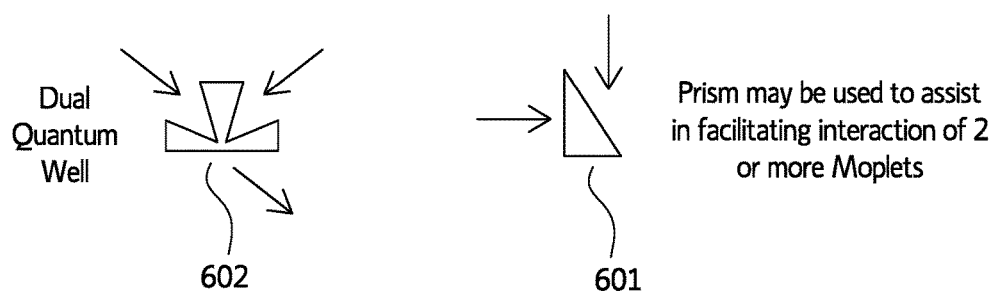
FIG. 20 shows a stylized view of a dual quantum well positioned at a collision point, in accordance with an exemplary embodiment of the present disclosure.
FIG. 21 shows a plan view of a prism configured to facilitate interaction of two or more moplets, in accordance with an exemplary embodiment of the present disclosure.

FIGS. 19-21 recognize that moplets could be allowed to interact in space time, without an underlying structure, by mere timing and trajectory forming a collision point 600 which is a virtual junction. A dual quantum well 602 could be deposited at this communication point, which can be a quantum dot arrangement or a single quantum dot (quantum dot arrangement not shown) to further enforce assurance the two moplets will come into sufficient contact with one another to cause maximum entanglement. A prism 601 can also be configured as a communication point device, assuring the same net sum effect achieving maximum entanglement between the simultaneous arriving and departing moplet(s).

FIGS. 22 and 23 depict a moplet in accordance with an exemplary embodiment of the present disclosure, shown at 705, compatible with the embodiment of FIG. 7 that will require additions to the polarizers and detectors. The key distinguishing feature of moplet 705 is a shell 702 and a core 701 shown as cylindrical form where shell 702 stays superpositional at all times. Cylindrical shaping of moplet 705 is not limiting as one of skill can easily understand; a cube structure and other possible forms can be used while maintaining the spirit and function of the embodiment.

As shown in FIG. 24, a detector 706 is needed to distinctly measure the arriving shell(s) and pass their voltage value to the conventional electronics off-loading circuitry. Fluctuation of this value indicates tampering or system malfunction due to any of a myriad of causes including contamination or damage. A core detector 703 is shown to measure core 701 holding a single v-qubit, and a periphery or peripheral detector 707 is configured to measure shell 702. In an alternative embodiment, also shown in FIG. 23, a windmill core detector 704 is shown to measure the core holding four (4) independent v-qubits similar to the function of windmill detector 501, which was not equipped to detect shell 702 and discern between shell 702 and core 701 of cylindrical moplet 705, used for higher security purposes in developing a more powerful and secure quantum computing system and solution.

Figure 25:
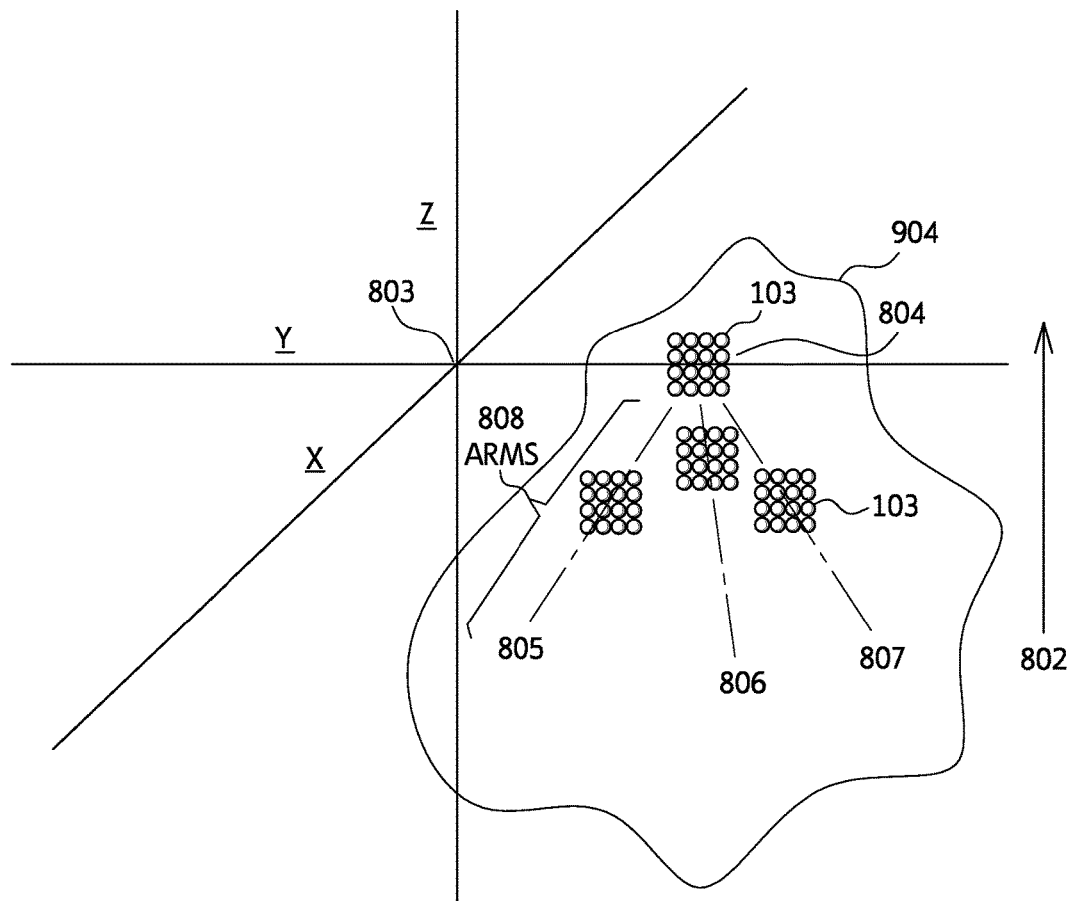
FIG. 25 shows a perspective stylized view of a three dimensional moptet formation.
Figure 26:
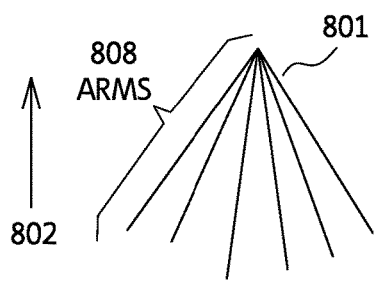
FIG. 26 shows a schematic view of a three dimensional moptet formation.
Figure 27:
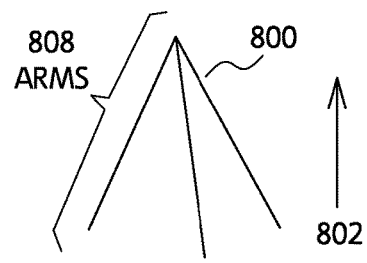
FIG. 27 shows another schematic view of a three dimensional moptet formation.

FIGS. 25-27 are depictions of a moptet formation that is three dimensional and structured in such a way as to allow for all moplets forming the moptet to be intentionally fully and maximally entangled so as to conserve any information in the primary moplet. The configurations of moptets shown in FIGS. 25-27 are simplified versions of three-dimensional moptets that could be used in pyramidal processing. It should be understood that pyramidal processing using three-dimensional moptets can be significantly more complex than shown in FIGS. 25-27, and can involve hundreds and even thousands, or more, of moplet groups. The structure of a moptet 904 shown is moving at the Planck constant "c." The entangled structure of moptet 904 assures when the central and foremost moplet is polarized, the arms of the structure comprised of the remaining moplets making up the moptet, are all polarized identically and instantly. There is no propagation delay. FIG. 25 shows a 3-dimensional grid 803, forming X, Y, and Z axes. Moplets 103 and moptet 904 are moving in direction 802.

As shown in FIGS. 26 and 27, wire frame schematics 800 and 801 represent moplets forming moptets which are prearranged, which provides the advantages of knowing where the moptets are in space and time without restriction to a line or plane rather than a 3-dimensional structure. Such configuration further provides expanded density, which, for example, increases information density. The effect of a 3-dimensional moptet is that when lead moplet 804 is fully polarized, the value of this polarization travels down all three arms of moptet 904. The flow of data is opposite the direction of the moving moptet 904, following along the arms of the structure. Arms in general are labeled 808.

Figure 28:
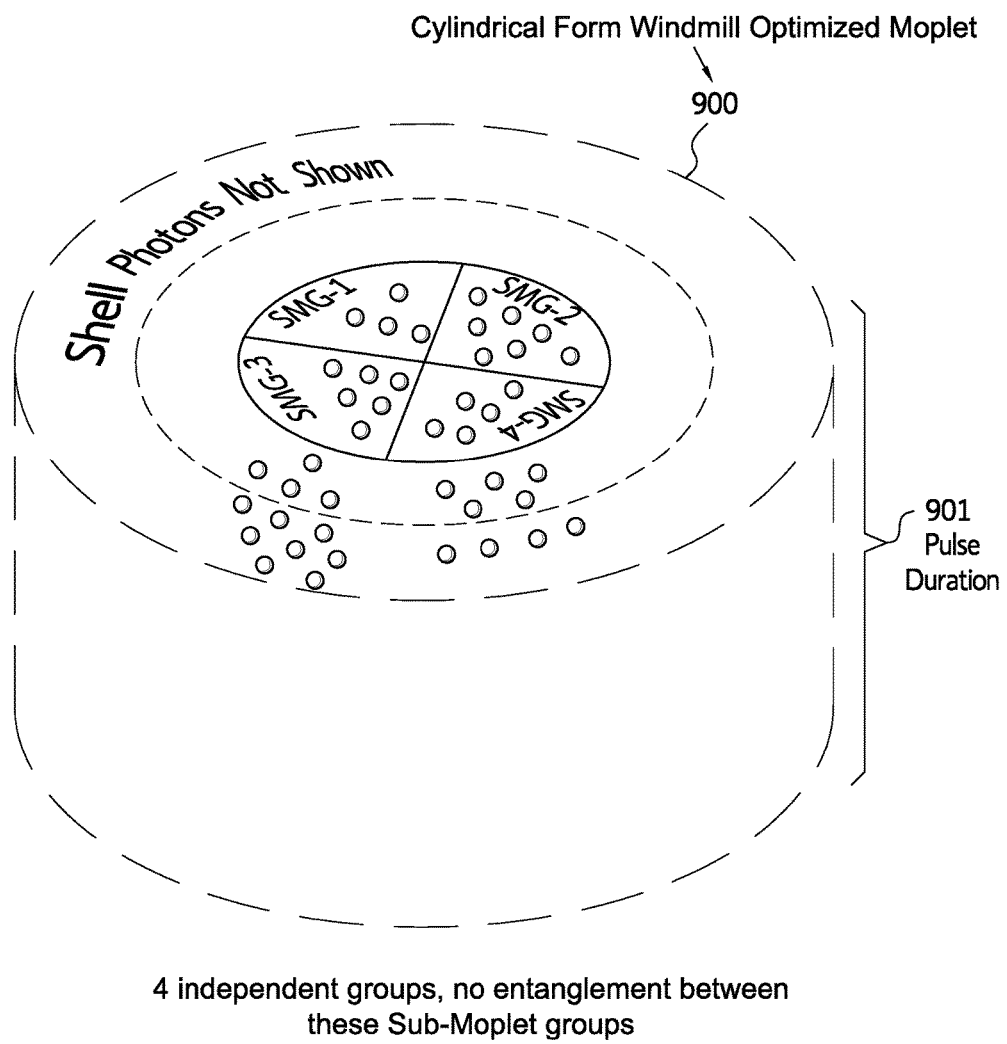
FIG. 28 shows a stylized view of a cylindrical form windmill optimized moplet, further including a plurality of sub-moplet groups (SMGs) SMG 1, 2, 3 and 4, which is also an embodiment of a shelled virtual qubit or sv-qubit.

FIG. 28 depicts a cylindrical form windmill optimized moplet 900, further introducing the concept of sub moplet Groups (SMGs) SMG 1, 2, 3 and 4. A sub moplet group is fully entangled with the other photons within the SMG and then, may be entangled to other SMGs not in the same moplet. Therein, it would require at least two moplets forming a moptet to have SMGs that are entangled with each other or one to the other. Shell moplet groups use the cylindrical form where the core will function within the shell as if it were four independent v-qubits with the added security feature of the shell.

It should be understood that polarization is only one type of entanglement for groups of subatomic particles and atoms. Other types of entanglement can include for example, time-bin, momentum, etc.

Figure 29:
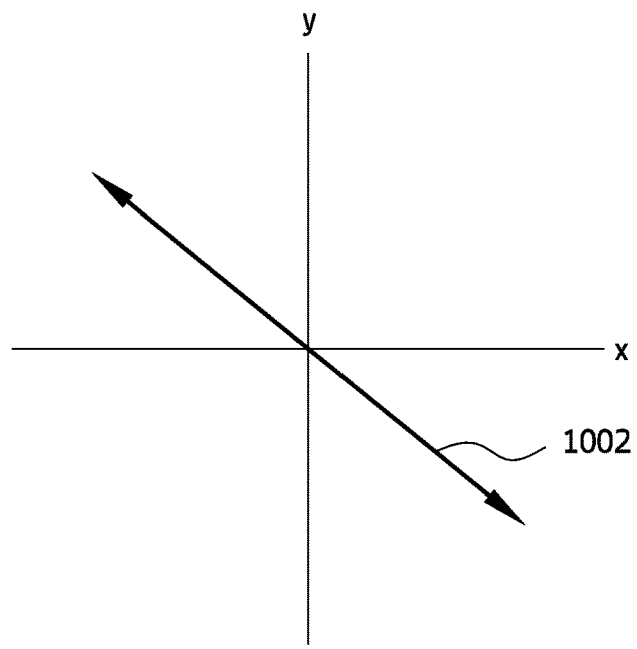
FIG. 29 shows a stylized view of a moplet wave prior to receiving information.
Figure 30:
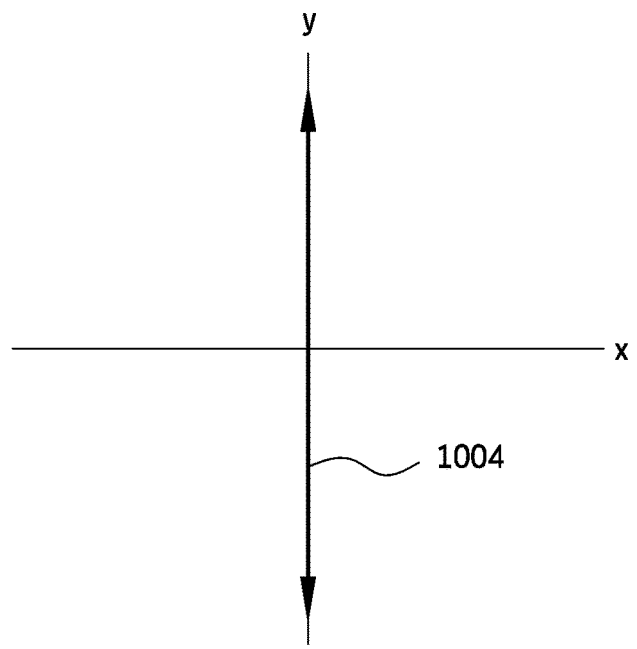
FIG. 30 shows a stylized view of the moplet wave after receiving information.

FIGS. 29 and 30 show how data or information is transferred to a v-qubit. In FIG. 29, which represents the polarization state of a group of entangled particles, each particle of the group of entangled particles is un-polarized, as shown by line 1002. Once data or information is transferred to the group of entangled particles, each particle will acquire a polarization state, which can be, for example, vertical polarization 1004, as shown in FIG. 30, or horizontal polarization, which, though not shown, is perpendicular to the vertical polarization shown.

Figure 31:
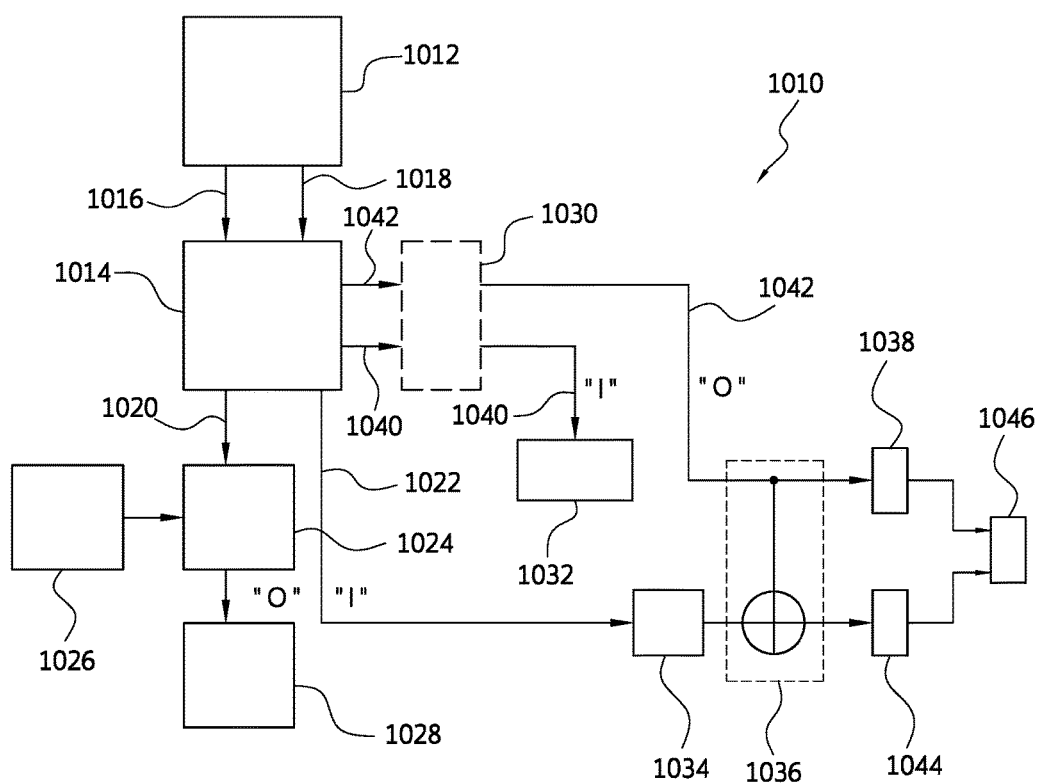
FIG. 31 shows a system using moptets, including a controlled NOT, C-NOT, or CNOT gate.

FIG. 31 shows a portion of a system incorporating v-qubits in accordance with an exemplary embodiment of the present disclosure, indicated generally at 1010. System 1010 includes a particle generator 1012, which can be, for example, a laser. Laser 1012 can be configured to generate groups of particles for future entanglement, such groups of particles can be output serially or via parallel outputs 1016 and 1018. System 1010 further includes an entanglement device 1014, which receives particles from particle generator 1012. Entanglement device 1014 is configured to either entangle groups of particles, or is configured to organize individual oplets into optets, moplets, and moptets, and to then entangle the particles.

System 1010 further includes a modulator 1024, a data input device 1026, one or more particle destruction devices 1028 and 1032, a polarizer 1034, a quantum device, which can be a C-NOT or CNOT gate 1036, detectors 1038 and 1044, and a non-transitory memory 1046. The output from entanglement device 1014 is output via output paths 1020 and 1022, which can be, for example, a long-line fiber optic cable, to modulator 1024 and to polarizer 1034. Modulator 1024 receives data from data input device 1026, and transfers the data to groups of entangled particles. When the entangled particles receive the information, complementary entangled particles traveling along output path 1022 automatically change state to a complementary value. Thus, if a moptet is changed to a "0" state in modulator 1024, a complementary moptet traveling along output path 1022 changes state from an un-polarized state to a "1" state. To prevent a change in state of a moptet traveling along output path 1022, the moptet output from modulator 1024 along output path 1020 can be eliminated by particle destruction device 1028.

The particle that flows along output path 1022 travels to quantum device 1036, which is a communication point device and a CNOT gate in the embodiment of FIG. 31.

While each moptet travels along output path 1022, other moptets travel from entanglement device 1014 along output paths 1040 and 1042. These moptets can be time delayed via an optional time delay device 1030, which can be a high-index optical material, a resonator, a physically long optical path, i.e., a long line optical transmission path or pathway, such as a fiber optic cable, etc., for adjustment of timing of arrival of the moptet at quantum device 1036. It should be understood that many particle interaction devices, such as fiber optics, polarizers, fiber optic transceiver systems, long-line fiber optic communication systems, optical communication systems, etc., can have optimal operating characteristics, such as an optimal frequency or wavelength of the moptets and moplets that interact or flow along such particle interaction devices. Accordingly, the particle generation device is configured to generate particles having optimal characteristics for interaction with particle interaction devices, such as frequency and amplitude, pulse shape, pulse size or duration, etc. Such characteristics are optimized for operation with particle interaction devices to reduce loss and decoherence, particularly over relatively long distances, such as, for example miles, kilometers, or further.

The moptet that travels along output path 1040 enters moptet or particle destruction device 1032, where the moptet is destroyed to prevent information contamination of the moptet that travels along output path 1042.

The moptet that travels along output path 1042 enters quantum device 1036 at the same time as the moptet that travels along output path 1022 to enable combining of an array of "1" and "0" values in quantum device 1036. Once the values of the moptets traveling along output path 1022 and output path 1042 reach quantum device 1036, which is timed to happen nearly or approximately simultaneously, quantum device 1036 outputs a logic state that is based on the information states of the moptets entering quantum device 1036. The outputs from quantum device 1036 travel to detectors 1038 and 1044, which then indicate the result of the data output from quantum device 1036, and which can be stored in non-transitory memory 1046.

It should be understood that a processor can include millions of quantum devices 1036 that are timed to perform a trillion or more operations per second. Because of the reliable structure of moptets, such operations can be conducted on an error-free basis, as opposed to conventional quantum computing, which uses individual particles, and suffers from decoherence.

Figure 32:
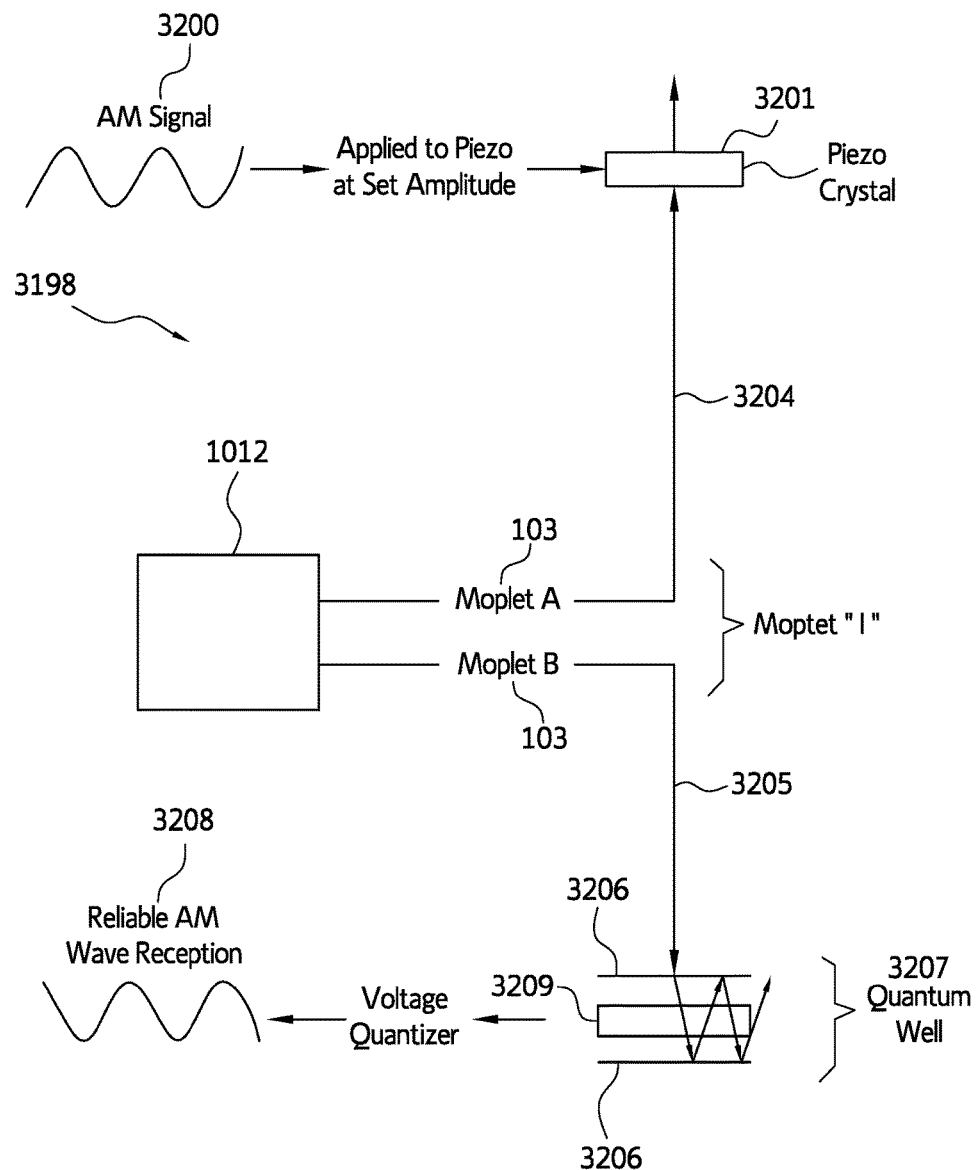
FIG. 32 shows a quantum communication transmission system in accordance with an exemplary embodiment of the present disclosure.

FIG. 32 shows a quantum communication transmission system in accordance with an exemplary embodiment of the present disclosure, indicated generally at 3198. System 3198 includes particle generator 1012, a photoelectric effect device 3201, another photoelectric effect device 3209, and a quantum well 3207. Particle generator 1012 functions as previously described to generate entangled groups of particles, which travel along output paths 3204 and 3205 to photoelectric effect devices 3201 an 3209.

One first moplet 103 is transmitted along a pathway 3204 to piezoelectric effect device 3201. An electrical signal 3200, which can be, for example, an amplitude modulated (AM) signal, is applied to device 3201, which causes device 3201 to act as a polarizer, polarizing first moplet 103 as it passes through device 3201. Polarization of each moplet 103 is a value representing a time slice of the AM signal. One second moplet 103 is transmitted along a pathway 3205 to quantum well 3207, which causes second moplet 103 to pass repeatedly through piezoelectric effect device 3209, causing a photoelectric effect in device 3209, which generates an electric signal representative of the time slice value, which can be described as cloned time slices. Piezoelectric effect device 3209 can be configured in a conventional manner to be part of, for example, an amplifier circuit able to concatenate the cloned time slice values into an output signal that is nearly an exact copy or clone of AM input signal 3200. Such output signal is created reliably at location 3208 separated physically from the location of original AM signal 3200. Such physical separation can be, for example, feet, yards, miles, thousands of mile, or greater. It should be understood that system 3198 is continuously generating and transmitting moplets 103 at, for example, hundreds to a few thousand pulses per second, which is sufficient for transmission and recreation of an AM signal for communication. The transmission speed of system 3198 is limited by the response of piezo electric effect devices 3201 and 3209. It should be understood that the speed of transmission of the data slice from device 3201 to device 3209 is instantaneous because of the inherent behavior of entangled particles, regardless of the distance between the moptet groups of particles. It should be understood that the term "AM signal" is used for the purpose of description. Signal 3200 can also be a frequency modulated (FM) signal, or a digital signal, such as, for example, a direct digital or binary data stream.

For purpose of building a long-line quantum communication system, of which system 3198 is one example, it is more preferred to have pulses which are emitted in groups, both near end and far end, or where there are several far ends, such as at devices 3201 and 3209, near end to multiple far ends, all synchronized. Each pulse, being trapped in a quantum well, such as quantum well 3206, passes from one side to the other synchronized with its entangled pulse (or pulses).

There is a mediating material between the walls of the quantum well, such as piezo electric device 3209, which could be solid, liquid, gaseous, trapped atom or atoms, quantum dot, or ion.

The mediating material could be small, such as single atom or a cluster of atoms, or more substantial in its sizing, perhaps taking up all the space between well walls, the idea is then to realize that when you polarity modulate the near end pulse, all the far end pulses are instantly modified, but 90 degrees rotated in their polarization. The mediating material is selected for its natural ability to non-interact with superpositional or non-polarized photons, as opposed to vertical or horizontal polarizations (or other types of polarization), to then register differing voltages per pulse, than had the pulse never been modulated at all. The pulses received at the far ends can be converted to voltages, as described herein, using this method, which will present a pattern which can be used to reconstruct the modulating signal applied at the near end.

System 3198 can be configured to generate and deliver pulses along discrete transmission pathways to, for example, circumnavigate the globe and have points where the paths end to then trap the pulse within the pathway. Therein, somewhere is a particle generator which creates short duration pulses of fully entangled light, spaced with a known spacing pattern and then emitted in this global net to cause a pulse to be in each quantum well that is synchronized with another pulse in each of the other quantum wells. Now, communication can commence from any one quantum well to another quantum well, through modulation. Therein, some synchronous and asynchronous forms of inputting the data to the network could be leveraged.

The transmission speed of the data between entangled particles is absolute zero or instant. Latency will appear from other elements which are classical or conventional elements. This said, the photon entangled pathway switches instantly, with no readable latency or delay.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

I claim:

1. A system for interacting with groups of entangled particles, the system comprising:
a communication point configured to receive at least one group of entangled particles, each particle of the at least one group of entangled particles containing an identical entanglement value or state such that the at least one group of entangled particles contains the identical entanglement value or state, the communication point configured to perform an operation on the at least one group of entangled particles based on the entanglement value or state of the at least one group of entangled particles, and after the operation is performed, the communication point is configured to provide an output having a logic state based on the entanglement value or state of the at least one group of entangled particles.

2. The system of claim 1, wherein the communication point combines the entanglement values or states of two groups of entangled particles, and the outputted logic state is based on the entanglement values or states of the two groups of particles.

3. The system of claim 1, including at least one detector positioned to receive the output from the communication point.

4. The system of claim 3, wherein the detector converts the received output to voltages that represent a pattern that is used to reconstruct a modulating signal imparted to a received plurality of groups of entangled particles.

5. The system of claim 1, wherein the groups of entangled particles are organized into groups defined as moplets, and the moplets are grouped into larger groups defined as moptets.

6. The system of claim 1, wherein the communication point includes a piezoelectric effect device, and the piezoelectric effect device generates an electric signal representative of a time slice value from the entanglement value or state of the at least one group of entangled particles.

7. The system of claim 6, wherein a plurality of time slice values from a plurality of groups of entangled particles received over an interval are concatenated into an electric signal representative of an input signal used to generate a plurality of sequential groups of entangled particles, each entangled particle of each group of one particular group of entangled particles having a same entanglement value or state.

8. The system of claim 1, wherein the communication point modulates an entanglement value or state into or out from the at least one group of entangled particles, and perpetuates the entanglement value or state in the communication point as a mode of storage.

9. The system of claim 8, wherein the communication point generates a new finite entanglement group for continued processing.

10. The system of claim 1, wherein the operation performed on the at least one entangled group of particles by the communication point is instantaneously propagated to an entanglement value or state of all other groups of particles entangled with the at least one entangled group of particles.

11. The system of claim 1, wherein the communication point is configured to emulate one of a logic state and an N-State logic, including at least binary logic and multi-state logic.

12. The system of claim 1, wherein the communication point includes one or more of a polarizer, a detector that outputs a voltage and current, a filter, a piezoelectric device that outputs a voltage and current, a photoelectric device that outputs a voltage and current, a reflector, a prism, and a CNOT gate.

13. The system of claim 12, wherein the polarizer is a segmented polarizer.

14. The system of claim 12, wherein the polarizer is arranged in a windmill pattern.

15. The system of claim 1, wherein the communication point is a virtual junction and a quantum well is positioned at the virtual junction.

16. The system of claim 1, wherein the entanglement value of the at least one group of entangled particles is an average of the entanglement value of each particle in the at least one group of entangled group.

17. A system for interacting with groups of entangled particles, the system comprising:
  a communication point configured to receive a plurality of groups of entangled particles, each particle of a respective group of entangled particles containing an identical entanglement value or state such that each respective group of entangled particles contains the identical entanglement value or state, the entanglement values or states of the plurality of groups of entangled particles representative of a series of time slice values representative of a signal used to set a respective identical entanglement value or state for each of the plurality of groups of entangled particles, and the communication point configured to interact with plurality of groups of entangled particles to create an output signal that is representative of the signal used to create the respective identical entanglement value or state.

18. The system of claim 17, wherein the output signal is created by concatenating the entanglement values or states of the plurality of groups of entangled particles into the output signal.

19. The system of claim 17, wherein the interaction of the communication point with the plurality of groups of entangled particles includes one of modulating an entanglement value or state into or out from at least one group of the plurality of groups, perpetuating the entanglement value or state of the at least one group of the plurality of groups as a mode of storage, performing an operation on the at least one group of the plurality of groups, and generating a new entangled group of particles for continued processing.

* * * * *